United States Patent
Kaplenski et al.

(10) Patent No.: US 6,746,037 B1
(45) Date of Patent: Jun. 8, 2004

(54) TRAILER HITCH WITH MULTI-DIRECTIONAL DAMPENING SYSTEM AND SPHERICAL ROD-END ASSEMBLY

(75) Inventors: Craig A. Kaplenski, 1549 Sand Bar Ferry Rd., Beech Island, SC (US) 29841; Terry D. Marshall, Augusta, GA (US)

(73) Assignee: Craig A. Kaplenski, Beech Island, SC (US)

( * ) Notice: Subject to any disclaimer, the term of this patent is extended or adjusted under 35 U.S.C. 154(b) by 0 days.

(21) Appl. No.: 10/281,650

(22) Filed: Oct. 28, 2002

Related U.S. Application Data (63) Continuation-in-part of application No. 10/025,066, filed on Dec. 19, 2001.
(60) Provisional application No. 60/257,183, filed on Dec. 20, 2000.

(51) Int. Cl.[7] .............................. B60D 1/50; B62D 3/08
(52) U.S. Cl. ........................ 280/484; 280/439; 280/483
(58) Field of Search .................................. 280/483, 484, 280/485, 486, 490.1, 491.2, 492, 493, 433, 438.1, 439, 440, 441

(56) References Cited

U.S. PATENT DOCUMENTS

| | | | |
|---|---|---|---|
| 2,150,269 A | 3/1939 | Dreisbach | |
| 2,733,931 A | 2/1956 | Reid et al. | |
| 2,968,496 A | 1/1961 | Gouirand | |
| 3,137,515 A | 6/1964 | Masser | |
| 3,203,723 A | 8/1965 | Montenare | |
| 3,208,770 A | * 9/1965 | Freitas et al. | 280/440 |
| 3,227,470 A | 1/1966 | Funk | |
| 3,269,751 A | 8/1966 | Whattoff | |
| 3,380,758 A | * 4/1968 | Granning | 280/425.1 |
| 3,400,949 A | 9/1968 | Kendall | |
| 3,426,377 A | 2/1969 | Beckwith et al. | |
| 3,708,183 A | 1/1973 | Jones | |
| 3,865,406 A | 2/1975 | Dutton | |
| 4,057,265 A | 11/1977 | Grace | |
| 4,137,587 A | 2/1979 | Rosengren | |
| 4,148,498 A | 4/1979 | Taylor, Jr. | |
| 4,153,270 A | 5/1979 | Brockmiller | |
| 4,215,876 A | 8/1980 | Jacks | |
| 4,373,847 A | 2/1983 | Hipp et al. | |
| 4,564,209 A | 1/1986 | Kingsley et al. | |
| 4,580,806 A | * 4/1986 | Kolstad et al. | 280/407 |
| 4,632,371 A | 12/1986 | Wirges et al. | |
| 5,209,316 A | 5/1993 | Bauer | |
| 5,226,675 A | 7/1993 | Noah et al. | |
| 5,413,366 A | 5/1995 | Gibbons | |
| 5,427,471 A | 6/1995 | Godbersen | |
| 5,503,423 A | 4/1996 | Roberts et al. | |
| 5,639,106 A | 6/1997 | Vitale et al. | |
| 5,695,204 A | 12/1997 | Ford | |
| 5,704,086 A | 1/1998 | Hansen et al. | |
| 5,823,560 A | 10/1998 | Van Vleet | |
| 5,836,603 A | 11/1998 | Logan et al. | |
| 6,116,631 A | 9/2000 | Logan et al. | |
| 6,170,849 B1 | * 1/2001 | McCall | 280/433 |
| 6,170,852 B1 | 1/2001 | Kimbrough | |

* cited by examiner

*Primary Examiner*—Anne Marie Boehler
(74) *Attorney, Agent, or Firm*—McDonnell Boehnen Hulbert & Berghoff LLP (57) ABSTRACT

An adjustable trailer hitch for use with automobiles, trucks, tractor-trailers, and other vehicles, and adapters for interfacing the trailer hitch to various trailer-vehicle combinations. The trailer hitch includes a first support member with least one generally vertical track, a second support member with a slide block assembly configured for slidable movement in the track, and a multi-directional dampening system operably connected between the first and second support members. In use, the trailer hitch interfaces the vehicle and the trailer, providing multidirectional dampening that mechanically isolates them from each other.

4 Claims, 8 Drawing Sheets

TRAILER HITCH WITH MULTI-DIRECTIONAL DAMPENING SYSTEM AND SPHERICAL ROD-END ASSEMBLY

This application is a continuation in part of Ser. No. 10/025,066 filed on Dec. 19, 2001 and claims benefit of Provisional appl. No. 60/257,183 filed Dec. 20, 2000.

BACKGROUND OF THE INVENTION

1. Field of the Invention

The present invention relates to trailer hitches, including receiver, gooseneck, and fifth wheel type hitches for attachment to automobiles, trucks, tractor-trailers, and other vehicles. More particularly, the present invention relates to a trailer hitch with a slidably connected frame and carriage, wherein a multi-directional dampening system is operably connected between the frame and the carriage. The invention further relates to adapters for interfacing the trailer hitch to various trailer/vehicle combinations.

2. Discussion of Background

Trailers can be connected to tow vehicles by any of a variety of hitches, ranging from simple ball hitches and receiver hitches to heavy-duty gooseneck and fifth wheel hitches. The selection of hitch for any particular application depends on a number of factors, including the type of vehicle, the dimensions and weight of the trailer, and the anticipated load (including the weight, dimensions, and type of load). Hitches are available for virtually any motor vehicle on the market today: ball type hitches and receiver hitches are more commonly used with passenger vehicles and light trucks (automobiles, pick-up trucks, and the ever-popular sport-utility vehicles or SUVs) for light-duty hauling. Gooseneck and fifth wheel type hitches are used with heavy-duty pickup trucks and tractor-trailers used for hauling heavier loads.

Figure 1A:
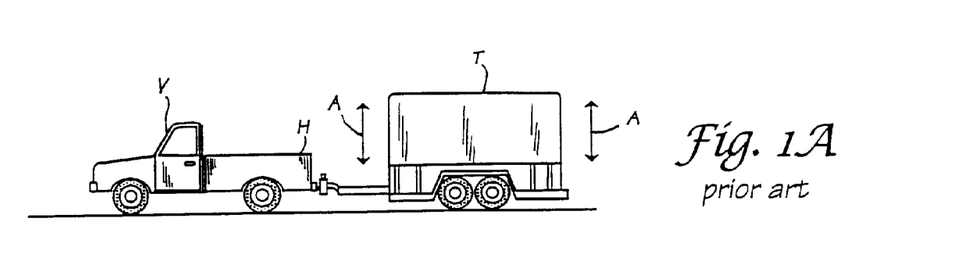
FIGS. 1A and 1B are side and top views, respectively, showing a trailer connected to a tow vehicle by a conventional locked-down hitch.
Figure 1B:
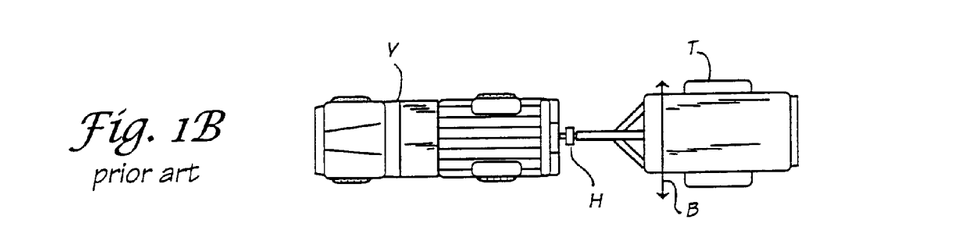

While in motion, all vehicles and all trailers tend to bounce or sway to some degree; the extent of such bouncing or swaying motion depends on the vehicle's speed and road conditions. When a trailer T is attached to a tow vehicle V by a standard lock-down or solid connection hitch H as shown schematically in FIGS. 1A and 1B, the trailer cannot rotate about its center of mass and therefore cannot move independently of the vehicle. As a result, any bouncing, swaying, and vibration of trailer T is transferred directly to vehicle V through hitch H, leading at best to an uncomfortable ride for the driver and passengers. Movement of trailer T relative to vehicle V in the vertical direction is represented by arrows A in FIG. 1A; relative movement in the horizontal direction is represented by arrow B in FIG. 1B. The safety of the driver and passengers is compromised whenever the relative movement of the trailer makes it more difficult to control the vehicle, for example, if the driver encounters high bumps, dips, railroad tracks, elevation changes, expansion joints, and situations that require emergency braking (which can cause jack-knifing) or other avoidance maneuvers. As trailer T bobs, bounces, and weaves, the back of vehicle V can sometimes be lifted off the road; the front end of the vehicle may also be lifted in turn and pushed from side to side, creating extremely dangerous conditions. Analogous concerns are found in other situations where a movable object is attached to a vehicle or a fixed support structure: boat docks, loading docks, airplane boarding bridges, and the like.

These problems are addressed by a variety of designs for trailer hitches and like apparatus. By way of example, Van Vleet (U.S. Pat. No. 5,823,560) discloses a trailer hitch apparatus with dampening mechanisms. The apparatus includes a hollow draw bar tube that can be coupled to a receiving tube mounted to a vehicle, and a ball hitch assembly carried by a transverse support bar attached to the outer end of the draw bar tube. The tube can move longitudinally with respect to the receiving tube; the ball hitch assembly is biased against vertical movement.

Gibbons (U.S. Pat. No. 5,413,366) shows a vertically adjustable hitch with a stationary portion that can be inserted into a trailer hitch tongue. The hitch includes a slider that is vertically movable with respect to a guide plate; the vertical position of the slider can be fixed via a pair of holes that can be aligned with respective detents of the guide plate. Jacks (U.S. Pat. No. 4,215,876) discloses a trailer hitch having a planar sliding plate mounted between a pair of spaced-apart, parallel vertical guides. A tongue extends outwardly from the slide; a conventional ball hitch is attached at the end of the tongue, and an adjustable-force leaf spring minimizes the transmission of shocks and vibrations between the tow vehicle and the load by providing variable resistance to vertical travel. Kendall (U.S. Pat. No. 3,400,949) describes a trailer hitch with a vertically-adjustable ball. The ball is attached to a mounting plate that is movable within a channel to any of a plurality of positions. Whatoffs (U.S. Pat. No. 3,269,751) adjustable hitch includes a pair of spaced-apart coil spring assemblies, a pair of tubular members that are telescoped in tubes for horizontal movement towards and away from the truck body, and a ball-type hitch attached to a slide plate that is movable vertically in a channel. Logan, et al. (U.S. Pat. No. 5,836,603 and 6,116,631) describe a trailer hitch assembly with variable pressure air springs (also termed "air bags" or "pneumatic shock absorbers") connecting the hitch and the support.

Fifth-wheel hitches are generally used for heavy-duty applications. Vitale, et al. (U.S. Pat. No. 5,639,106) describe a tractor-trailer fifth wheel air suspension assembly with a mounting frame connected to a tractor body frame and a movable frame for supporting the fifth wheel. The movable frame is supported on the mounting frame by a two-point or four-point air suspension system which stabilizes the trailer load when hauling. The movable frame has slides which are received in channels on the mounting frame. Noah, et al. (U.S. Pat. No. 5,226,675) discloses a fifth wheel suspension apparatus designed to reduce the magnitude of changes in vertical force transmitted to a tractor from a trailer. The apparatus includes a sensor, an actuator and a controller. The sensor transmits a signal indicating the vertical force transmitted from the trailer through the fifth wheel hitch to the controller, which then varies the amount of vertical force applied to the fifth wheel hitch by the actuator. The apparatus includes an air spring for adjusting the displacement of the hitch from the tractor. Bauer (U.S. Pat. No. 5,209,316) provides a truck cab suspension unit with two U-shaped yokes, an air spring, and shock absorbers. Funk (U.S. Pat. No. 3,227,470) provides a tractor-trailer load transferring device that includes an air bag assembly positioned between two pairs of guide tubes, each tube having a slidable guide rod therein. Masser (U.S. Pat. No. 3,137,515) discloses a fifth wheel structure that includes a pair of air bags that support one of the fifth wheel, the structure functions as a conventional fifth wheel if the air bags should fail. Gouirand (U.S. Pat. No. 2,968,496) shows a pneumatic chamber rigidly mounted at the rear of a truck frame. The chamber, which has a circular cross-section, has a lower diaphragm connected to the rear axle of the trailer; an upper diaphragm supports the lower plate of a fifth wheel assembly. Reid, et al. (U.S. Pat. No. 2,733,931) provide a fifth wheel suspension that includes a pair of air springs; the degree of cushioning provided by the air springs is automatically adjusted to compensate for changes in the load.

Special-purpose hitches include those designed for hauling mobile homes. For example, Kingsley, et al. (U.S. Pat. No 4,564,209) disclose a trailer hitch assembly having a fixed frame attachable to the rear of a truck, a transverse carriage mounted to the frame, a piston, and ram assemblies for moving the carriage vertically and laterally with respect to the frame. The assembly includes two sets of roller assemblies, each with three sets of rollers and associated channels. Brockmiller's (U.S. Pat. No. 4,153,270) apparatus includes a tiltable sliding hitch-ball holder and a guide rack where pin-mounted rollers guide the vertical movement of a carriage on a pair of vertical poles. The sliding hitch-ball holder is raised on the poles by dual cylinders, and telescoping poles connect the upper end of the apparatus to a crossbar at the rear of the truck. Taylor (U.S. Pat. No. 4,148,498) describes a trailer hitch with a hydraulically elongatable tongue and an adjustable connector ball assembly; hydraulic cylinders and springs adjust the tongue and the height of the connector ball. Grace (U.S. Pat. No. 4,057,265) provides a towing apparatus having three control levers that allow the operator to adjust the position of a hitching ball forward and rearward, laterally, and vertically with respect to the tow vehicle. The apparatus includes several hydraulic cylinders and several sets of rollers that move in corresponding horizontal or vertical channels. Dutton (U.S. Pat. No. 3,865,406) shows a horizontally movable gear plate and standard hitch ball that is movable vertically in a slideway via a rack-and-pinion arrangement. The slideway has a pair of opposing vertical guide rails. Jones (U.S. Pat. No. 3,708,183) discloses a trailer hitch having a fixed frame attached to the rear of a tow vehicle, a drawbar resiliently mounted to the frame, and a standard ball-type connector attached to the drawbar. The fixed frame has two spaced-apart vertical channels that hold shock-absorbing compression springs. The drawbar rides on the springs; the ball connector is attached to a slide plate that is movable vertically in a channel formed by a pair of guide slots.

Other types of mechanisms for use with boarding bridges, docks, and other devices are available to consumers. Hansen, et al. (U.S. Pat. No. 5,704,086) describe a passenger boarding bridge for use with airplanes. The bridge has two slidable sections that move on rollers, and that can be raised and lowered by vertically-adjustable jacks. It includes stabilizing rollers or slide blocks. Godbersen (U.S. Pat. No. 5,427,471) shows a dock mounted boat hoist with a vertical main post mounted on a dock and a platform unit for supporting a small boat. The platform is slidably connected to the main post and a frame; a cable and winch are used for raising and lowering the platform. Wirges, et al. (U.S. Pat. No. 4,632,371) provide a gas spring for jumping stilts. Their device includes a plunger and a gas exchange chamber connected to the working chamber by a passage. The device allows the user to adapt the spring force to the his weight and level of skill. Montenare's (U.S. Pat. No. 3,203,723) pneumatically-cushioned bumper has a plurality of telescoping sections whose movement is facilitated by rollers. Dreisbach (U.S. Pat. No. 2,150,269) shows a floating drawbar guide for tractors. His device includes a pair of springs (with pistons) within a casing that is slidable in a guide tube. Each of the springs also includes a piston. Hipp, et al. (U.S. Pat. No. 4,373,847) disclose a releasable locking device for securing a parked vehicle to an upright structure. Their device includes a fixed frame with a pair of spaced-apart, parallel guide tracks, and a ratchet mechanism and spaced-apart rollers for adjusting the height. Rosengren (U.S. Pat. No. 4,137,587) shows a dockboard with a pivotable ramp which is movable between a vertical, storing position and a horizontal, working position. The chassis includes a pair of rollers on each side; these help prevent locking of the chassis by skewing. Beckwith, et al. (U.S. Pat. No. 3,426,377) provide a dockboard with a carriage that is movable via rollers that move in a pair of spaced-apart vertical channels. The dockboard includes separate lip and platform sections which are independently rotatable about a common axis, and which can be locked together to form a ramp.

Many presently-available trailer hitches used for connecting a trailer to a tow vehicle are complex and expensive to manufacture, high-maintenance, or do not allow for optimum vertical and lateral movement of the trailer with respect to the vehicle. Conventional lock-down hitches in particular transfer any bouncing, swaying, and vibration of the trailer to the vehicle (and vice versa), resulting in an uncomfortable ride and potentially dangerous driving conditions.

These concerns are addressed in co-pending U.S. application Ser. No. 10/025,066, filed Dec. 19, 2000, which discloses a trailer hitch for attachment to a tow vehicle for towing a trailer. The trailer hitch includes a first support member including at least one pair of spaced-apart, substantially parallel tubes, a second support member including at least one slide block assembly configured for slidable movement in the tubes, and a variable pressure air spring operably connected between the support members, one of which is attached to the tow vehicle and the other to the trailer. In use, the slide block assembly and the air spring provide a measure of multi-directional dampening to reduce transmission of relative motion between said tow vehicle and said trailer.

Despite the variety of products of this nature that are available to consumers, there is a continuing need for a simple, rugged, durable and versatile trailer hitch that can be adapted for use with passenger automobiles and light pickup trucks, heavy-duty pickups, trucks, and tractor-trailers.

SUMMARY OF THE INVENTION

According to its major aspects and broadly stated, the present invention is an adjustable trailer hitch with two support members, one of which is attached to a vehicle and the other to a trailer. The first support member, or frame, includes a generally vertical track; the second support member, or carriage, includes a slide block assembly configured for slidable movement in the track. A multi-directional dampening system is connected between the first and second support members, and mechanically isolates the trailer and the vehicle from each other. The invention also includes a variety of adapters for interfacing the trailer hitch to various vehicle/trailer combinations.

In one preferred embodiment of the invention, the frame is connected to the tow vehicle and the carriage to the trailer, with the slide block assembly engaging the track for slidable movement therein. In another preferred embodiment, the carriage is connected to the tow vehicle and the frame is connected to the trailer. While driving, the trailer hitch mechanically isolates the vehicle and the trailer from each other, providing multi-directional dampening of movement of the trailer with respect to the vehicle (and vice versa). Instead of acting as a single unit, the vehicle and the trailer act largely independently of each other: the bouncing, jerking, and swaying motions transferred from one to the other by many conventional hitches are reduced or eliminated, resulting in better control (for the driver) and a safer and more comfortable ride (for the driver, passengers, and load).

The multidirectional dampening system of the trailer hitch is an important feature of the present invention. The components of the system depend on the type of hitch (i.e., receiver, gooseneck, etc.), the vehicle, and the types and weights of loads to be carried by the trailer. The system may include at least one variable-pressure or adjustable-pressure air spring operably connected between the first and second support members, and, optionally, shock absorbers for helping absorb mechanical shocks. On receiver-type hitches, the system may also include at least one spherical rod-end assembly connected between the first and second support members for helping stabilize relative movement between them.

For purposes of this specification, the term "spring" refers to an elastic device that regains its original shape and/or position after being compressed or extended. The terms "air spring" and "pneumatic spring" refer to a type of spring in which the energy storage element is air (or other gas) confined in a container that includes an elastomeric bellows or diaphragm. The term "shock absorber" refers to a device for absorbing mechanical shocks, that is, for minimizing the acceleration of the mass of a mechanism or portion thereof with respect to its support. (Automobile shock absorbers include hydraulically dampened couplings for absorbing impulsive forces generated by the contact of automotive wheels with irregular road surfaces.) In colloquial usage, air springs are sometimes referred to as "air shock absorbers" or "pneumatic shock absorbers"; however, those skilled in the art avoid this usage in order to preserve the distinction between air springs and shock absorbers.

The combined action of the air spring, the spherical rod-end assembly, and the slide block assembly substantially reduces transmission through the trailer hitch of any relative movement of the trailer and the vehicle, thereby improving driver control as well as providing increased comfort and safety. When driving over bumps, potholes, railroad tracks, and the like, up-and-down, side-to-side movement of the trailer and the vehicle is substantially absorbed by the trailer hitch while continuing to move and turn as a single unit under the driver's control, relative movement of the trailer with respect to the vehicle is no longer transferred to the vehicle (and vice versa). This dampening action reduces transfer of trailer bouncing and swaying motions by as much as 80% over conventional lock-down hitches.

The spherical rod-end assembly is another important feature of the present invention. The spherical rod-end assembly includes at least one rod end operably connected between the first and second support members (i.e., the frame and the carriage) by generally spherical, swivel-type connectors. The connectors permit the rod end to rotate with respect to the support members. In all hitches that include the spherical rod-end assembly, the action of the assembly tends to stabilize the trailer hitch and further its multi-directional dampening action.

The combination formed by the slide block assembly and the track constitutes another feature of the present invention. The track is configured to receive the slide block assembly, which is configured and positioned to mate with the track when the trailer hitch is assembled. The track is preferably made of a sturdy, durable material such as stainless steel, aluminum or the like, and forms a channel that slidingly contains the slide block assembly, and preferably substantially enclose the slide block assembly when the trailer hitch is assembled for use. If desired, wear strips may be installed in the track to help extend the working life of the trailer hitch. The optimum configuration of the slide block assembly depends on the particular application. For example, the slide block assembly may include a single low-friction slide block attached to one of the first and second support members, a pair of low-friction slide blocks, or a plurality of pairs of slide blocks with a corresponding number of pairs of tracks. The slide block (or blocks) may be made of any suitable low friction material (such as ACETAL, NYLATRON, NYLON, TEFLON, or other suitable material) attached to suitable mounting blocks; alternatively, the slide block may be made\ of a metal core with a low-friction coating.

Still another feature of the present invention is the air spring, which connects the frame and the carriage to help dampen transmission of movement from the trailer to the vehicle (or vice versa) and also furthers adjustment of the trailer hitch for different loads. In a preferred embodiment of the invention, the air spring is a adjustable-pressure, single or double bellows type air (i.e., pneumatic) spring of the type sometimes referred to as an "air bag," "air spring," or the like (for purposes of this specification, the terms "air spring," "air bag," and "pneumatic spring" are used interchangeably). The air spring can be a manually-inflatable or automatically-inflatable type; these types of air springs can readily be inflated with a portable compressor, with an air hose (at service stations or other facilities), or with an on-board compressor and control system accessible to the driver of the tow vehicle.

Changing the pressure in the air spring helps adjust the trailer hitch for different types and weights of load. (While hydraulic or mechanical springs may also be useful, air springs are preferred because of their adjustable pressure.) If the air spring accidentally loses pressure, the trailer hitch functions as a conventional solid hitch (also known in the art as a lock-down hitch) until the driver can effect any needed repairs.

Yet another feature of the present invention is the adapters which are used to interface the trailer hitch between different types of vehicles and trailers. The adapters, which include weight distribution brackets, sway-bars, quick-change mounts, retainers, safety chains, spreader bar assemblies, spacers, and mounting plates having a plurality of user-selectable positions for attachment of the trailer hitch, allow the user to interface the invention with most presently-available vehicles and trailers. The adapters may also help adjust the invention for different loads.

Another feature of the present invention is its versatility. The invention can be configured as a receiver type hitch, a gooseneck type hitch, or a fifth wheel type hitch, in virtually any needed pin weight and towing capacity. The particular selection of components and materials for the trailer hitch depends on the specifications of the vehicle and the trailer, the anticipated loads to be carried by the trailer, and other factors evident to those of ordinary skill in the art.

Other features and advantages of the present invention will be apparent to those skilled in the art from a careful reading of the Detailed Description of Preferred Embodiments presented below and accompanied by the drawings.

DETAILED DESCRIPTION OF PREFERRED EMBODIMENTS

In the following detailed description of the invention, reference numerals are used to identify structural elements, portions of elements, surfaces or areas in the drawings, as such elements, portions, surfaces or areas may be further described or explained by the entire written specification. For consistency, whenever the same numeral is used in different drawings, it indicates the same element, portion, surface or area as when first used. Unless otherwise indicated, the drawings are intended to be read together with the specification, and are to be considered a portion of the entire written description of this invention as required by 35 U.S.C. §112. As used herein, the terms "horizontal," "vertical," "left," right," "up," "down," as well as adjectival and adverbial derivatives thereof, refer to the relative orientation of the illustrated structure as the particular drawing figure faces the reader.

Figure 2:
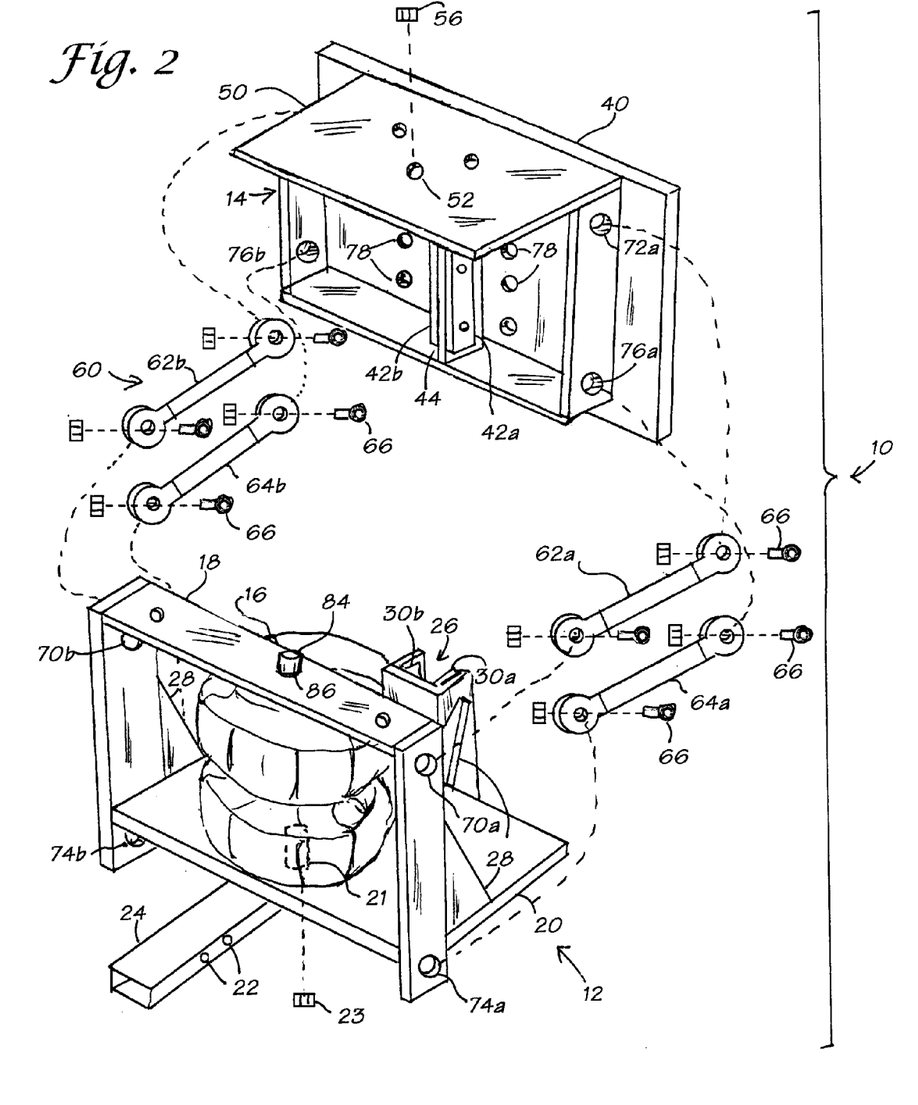
FIG. 2 is a partially exploded, perspective view of a receiver-type trailer hitch with a spherical rod-end assembly according to a preferred embodiment of the present invention.

Referring now to FIG. 2, there is shown a partially exploded, perspective view of a trailer hitch according to a preferred embodiment of the present invention. A receiver-type trailer hitch 10 (henceforth, "receiver hitch 10" or "trailer hitch 10") includes a first support member 12 and a second support member 14 with at least one air spring 16 connected therebetween. Devices such as air spring 16 are also referred to as "air bags"; these types of devices are occasionally—but improperly—referred to as "air shock absorbers," "pneumatic shock absorbers," "air springs," or the like. First support member 12 in this embodiment is a "fixed" support or frame with a frame 18 and a generally flat, horizontal mounting plate 20 having at least one throughhole 21 for attaching the frame to air spring 16 by any suitable type of fastener. Additional throughholes (such as throughhole or throughholes 22) may be used to attach first support member 12 to a tow vehicle by means of a bolt, pin, or other suitable fastener or fasteners. Alternatively, a hitch bar or towbar 24 may be used to attach first support member 12 to a receiver hitch or other suitable structure mounted to the tow vehicle.

At least one generally vertical track 26 is welded to plate 20 generally as shown, substantially perpendicular to the plate. A pair of reinforcing gussets may be welded to the tracks and plate 20 for added structural support (a gusset 28 is shown). Gussets 28, if present, provide additional structural support that helps prevent or minimize twisting of track 26 under extreme towing conditions; it will be understood that additional gussets and other reinforcements may be provided at other potential stress points of receiver hitch 10. Track 26 preferably encloses the slide blocks (to be described below) generally as shown.

A pair of wear strips 30a, 30b may be attached to the interior walls of track 26, to reduce wear and the effects of frictional forces during use of receiver hitch 10. Wear strips 30a, 30b, which may be replaceable, may cover all or part of the interior surfaces of track 26. Alternatively, the interior surfaces of the tracks may be coated with a low-friction, spray-on coating.

Second support member 14 is a "floating" support or carriage with a generally flat, vertical mounting plate 40. A slide block assembly with at least one pair of spaced-apart, substantially parallel slide blocks such as slide blocks 42a, 42b is attached to plate 40, configured and positioned so that the slide blocks slide freely in track 26 when receiver hitch 10 is fully assembled. Slide blocks 42a, 42b may be attached to a mounting bar 44 which is welded, bolted, or otherwise attached to plate 40. Alternatively, suitably configured slide blocks 42a, 42b (or a single such slide block) may be attached directly to plate 40. A trailer is connected to plate 40 by any suitable devices, including bolts, weight distribution bars, balls, and adapters according to the present invention (to be described further below).

Slide blocks 42a, 42b and wear strips 30a, 30b (if present) are made of any suitable hard, durable, low-friction material, including a plastic such as ACETAL, NYLATRON, NYLON, TEFLON, or other suitable materials. Alternatively, slide blocks 42a, 42b and wear strips 30a, 30b may be made of suitable laminate or composite materials. Mounting bar 44 may be integrally formed with slide blocks 42a, 42b, respectively, or made of any hard, durable material (including metal, composite materials, or engineering plastics).

As noted above, slide blocks 42a, 42b are configured to slide freely in track 26. Slide blocks 42a, 42b may be configured so as to have some "give" when receiver hitch 10 is fully assembled. That is, slide blocks 42a, 42b may exhibit a modest degree of back-and-forth, side-to-side movement within track 26 that provides a measure of cushioning and flexibility during use to optimize the dampening action of receiver hitch 10. Slide blocks 42a, 42b may have generally rectangular cross-sections as shown, but other cross-sectional shapes may also be useful (with an appropriately-shaped track 26). For example, track 26 may have a round or oval cross-section. If desired, two or more spaced-apart slide block assemblies may be provided, each with a pair of slide blocks 42a, 42b, each pair of slide blocks being slidable within its corresponding track 26.

A frame 48 with an outwardly-extending top plate 50 is attached to plate 40 by welding or other suitable technique. Plate 50, which is generally perpendicular to plate 40, has a throughhole 52 for attaching air spring 16. Plate 50 also acts as a stop to prevent the slide block assembly with slide blocks 42a, 42b from moving past the lower end of the track 26 when trailer hitch 10 is assembled. The bottom portion of frame 48 acts as a stop to limit the upward movement of slide blocks 42a, 42b. Alternatively, the top and bottom ends of track 26 may simply be closed. Alternatively, air spring 16 may be attached to first support member 12.

Air spring 16 has upper and lower mounting lugs which are dimensioned to fit through holes 52, 21. Air spring 16 is attached to plates 50 and 20 by inserting the lugs into holes 21, 52, and securing the lugs thereto by suitably-sized nuts. Washers or lock washers may be added if desired (for clarity, nuts, bolts, washers, and so forth are not shown in FIG. 2). As noted above, air spring 16 is preferably any convenient type of pneumatic (i.e., air or other gas) air spring, preferably a variable-pressure device wherein the pressure may be adjusted through a valve (not shown). Hydraulic or mechanical shock absorbers may be useful for some applications.

A spherical rod-end assembly or tie rod assembly 60 is attached between first support member 12 and second support member 14. Rod-end assembly 60 includes at least one pair 62a, 62b of rod ends connected between first and second support members 12, 14. Rod ends 62a, 62b are attached by connectors 66 mounted in throughholes 70a, 70b of first support member 12 and throughholes 72a, 72b of second support member 14. Preferably, two spaced-apart pairs of rod ends are provided, the second pair 64a, 64b attached by connectors 66 mounted in a second pair of throughholes 74a, 74b of first support member 12 and a second pair of throughholes 76a, 76b of second support member 14. Connectors 66 may be any suitable types of connectors that permit rotation or swiveling of each end of rod ends 62a, 62b, 64a, 64b with respect to first support member 12 and second support member 14, respectively.

Bump stops such as 58a, 58b may be attached to one or both of plates 20, 50 to cushion first and second support members 12, 14 against slamming. Bump stops 58b may alternatively be attached to stop 48. If present, bump stops 58a, 58b are made of a somewhat resilient, somewhat compressible material such as hard rubber or plastic. Preferably, two pairs of bump stops 58a, 58b are included, one pair on either side of air spring 16 (for clarity, only one pair is shown in FIG. 2).

Figure 3:
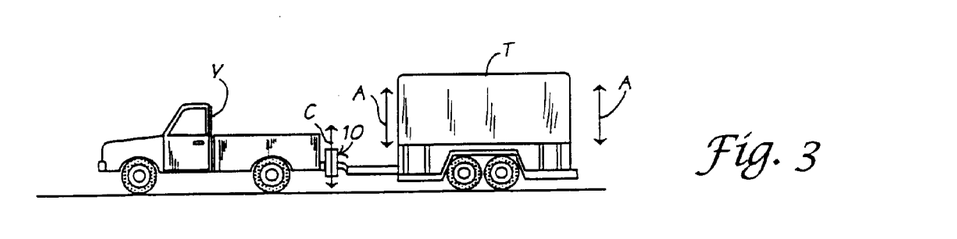
FIG. 3 is a side view showing a trailer connected to a tow vehicle by the receiver hitch of FIG. 2.

In use, receiver hitch 10 is connected between vehicle V and trailer T as indicated schematically in FIG. 3. Plate 40 may include a plurality of pairs 78a, 78b of spaced-apart throughholes. If present, throughholes 78a, 78b permit the user to select the optimum pair for attachment to the trailer, thereby allowing the user to optimize the relative heights of the trailer and the vehicle.

Air spring 16 is inflated to the selected operating pressure through a valve (not shown), thus, the pressure can readily be adjusted for different loads and towing conditions. The optimum pressure depends on the anticipated load, the specifications of vehicle V and trailer T, and road conditions, and is best determined by a modest amount of experimentation and observation for each combination of vehicle, trailer, and load.

Air spring 16 is attached to first support member 12 through hole 21, and secured by a nut 23 on a first end 84. Slide blocks 42a, 42b are inserted into track 26, and air spring 16 is attached to second support member 14 by a nut 56 on a second end 84. Rod ends 62a, 62b and 64a, 64b are connected between first and second support members 12, 14 by connectors 66.

Safety chains, sway bars, or other suitable devices may used on first support member 12 and/or second support member 14 in order to maintain the attachment between the tow vehicle and the trailer in case of separation of the support members. The safety chains may be operated by spring pins, removable latch pins, or other suitable devices. Weight distribution bars that transfer some of the weight of receiver hitch 10 forward to the front axle of vehicle V may also be installed, particularly if the rear of vehicle V is low due to tongue weight (in some locations, the use of weight distribution bars, safety chains, and like devices may be required).

While driving, movement of trailer T depends on road conditions as before, however, first support 12 and second support 14 move with respect to each other as the slide block assembly with slide blocks 42a, 42b slides in track 26 (FIG. 3). Vertical movement of the trailer is represented by arrows A; corresponding generally vertical movement of support members 12 and 14 with respect to each other is represented by arrow C. Air spring 16, together with slide blocks 42a, 42b moving in track 26 and rods 62a, 62b and 64a, 64b form a directional dampening system that mechanically isolates the vehicle and the trailer from each other, thereby reducing transmission of up-and-down, side-to-side movement between them. Instead of acting as a single unit, vehicle V and trailer T act substantially independently of each other. Transmission of movement between the vehicle and the trailer is dampened by the action of air spring 16 and the smooth, fluid movement of slide blocks 42a, 42b in track 26. Trailer T tends to move up-and-down about its own axis instead of about trailer hitch 10, so that the resulting bouncing, jerking, swaying, and vibration transferred from the trailer to the vehicle by a typical conventional hitch is reduced or eliminated. Trailer T and vehicle V are largely isolated from bumps, potholes, and other adverse road features traversed by the other, resulting in reduced transfer of movement between the trailer and the vehicle, and safer and more comfortable driving.

Test results indicate that receiver hitch 10 may transfer no more than approximately 20% of the movement transferred between vehicle V and trailer T by a conventional lock-down type hitch. This approximately 80% reduction results in better control for the driver, a smoother, safer ride for the driver, passengers, and cargo, and ultimately generates less wear and tear on vehicle V and trailer T.

Receiver hitch 10 may be manufactured in conformance with any applicable standards, for example, Class 3 and 4 hitches (approximately 800 lb. tongue weight, approximately 8,000 lb. gross trailer weight) and Class 5 hitches (approximately 2000 lb. tongue weight, approximately 20,000 lb. gross trailer weight). Two or more such hitches may be installed side-by-side on a single vehicle for heavier-duty applications. Receiver hitch 10 may also include accessories such as air pressure indicators and ride height indicators.

It will be evident that first support member 12 may be the floating support (i.e., carriage) and second support member 14 the fixed support (i.e., frame). In this embodiment of the invention, towbar 24 is attached to second support member 14 rather than first support member 12. Support members 12 and 14 operate generally in the same manner as the embodiment of FIGS. 2 and 3.

Receiver hitch 10 has at least one track 26 and a slide block assembly having slide blocks 42a, 42b, but may be manufactured with a plurality of tracks 26 with corresponding pairs of slide blocks 42a, 42b if desired. As will be evident, the optimum configurations and dimensions of the components of receiver hitch 10 depend on the anticipated combination of tow vehicle, trailer, load, and road conditions. Air spring 16 may be a single air spring, a single or double bellows air spring, or a plurality of air springs connected in series or parallel (i.e., operating in conjunction with each other or substantially independently of each other). As noted above, hydraulic or mechanical springs may also be useful for some applications. If desired, one or more auxiliary shock absorbers may be connected between first and second support members 12, 14 to provide additional dampening action.

Figure 4A:
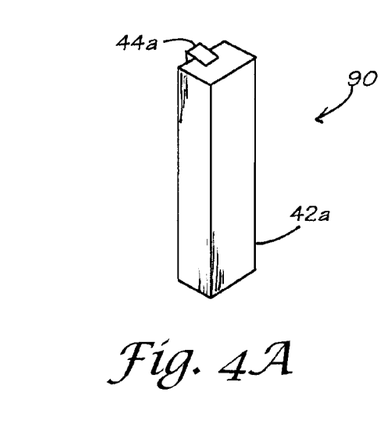
FIGS. 4A and 4B are perspective views of additional types of slide blocks usable with the invention.
Figure 4B:
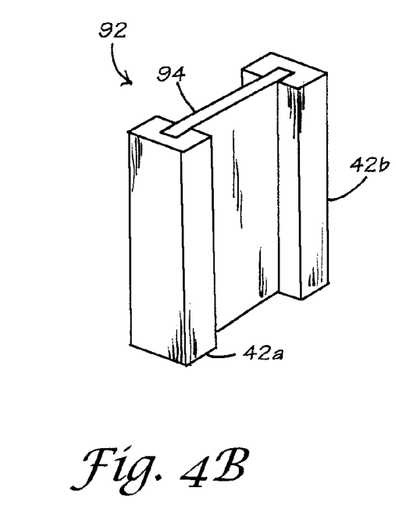

Track 26 and corresponding slide blocks 42a, 42b may assume different forms, as may be convenient for any particular application. For example, a slide block assembly 90 (FIG. 4A) has a slide block 42a attached to a support 44a, where support 44a is secured to support member 12 or 14 by welding or by suitable fasteners. Another slide block assembly 92 (FIG. 4B) has a pair of slide blocks 42a, 42b attached to a support plate 94, which is attached to support member 12 or 14. As noted above, slide blocks 42a, 42b may be of any suitable shapes, and are configured to slide freely in a corresponding track 26.

Slide blocks 42a, 42b may have oval, circular, or other cross sections (with correspondingly-shaped tracks 26a, 26b). For example, a slide block 42a usable with the invention may have a curved end 46 for use with a curved track 26a.

Figure 5A:
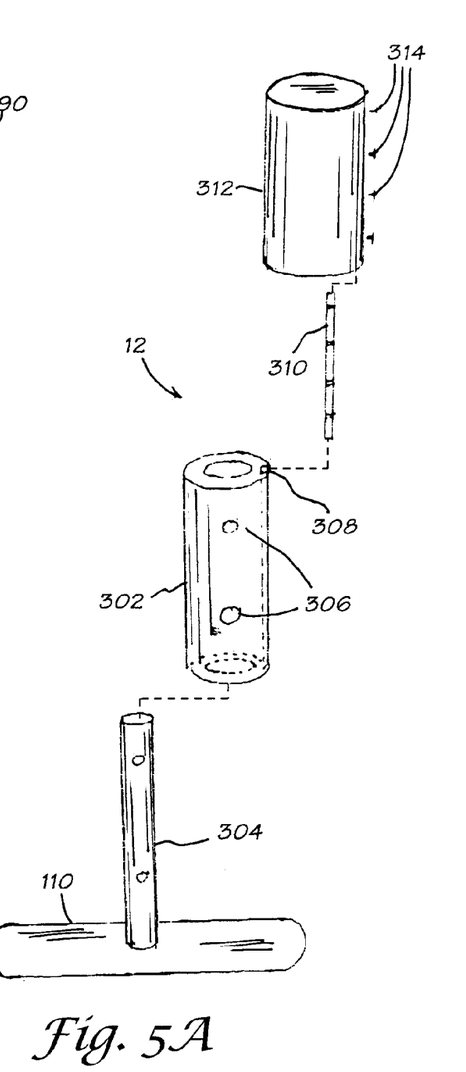
FIG. 5A is an exploded perspective view of the first support member of a gooseneck-type trailer hitch with multi-directional dampening system according to the present invention.
Figure 5B:
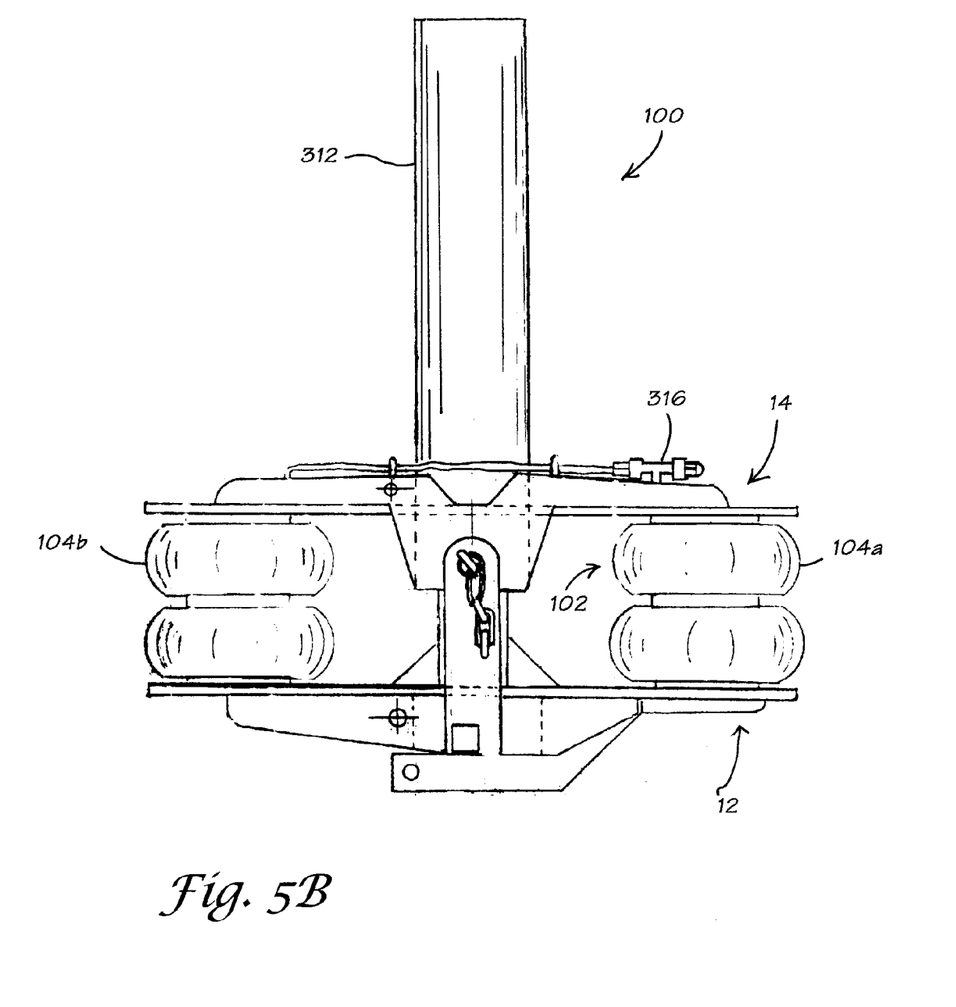
FIG. 5B is a side view of the gooseneck hitch of FIG. 5A.

Additional embodiments of the present invention include a gooseneck-type hitch as shown in FIGS. 5A and 5B. A gooseneck hitch 100 includes a first support member 12, a second support member 14, and an air spring assembly 102 (shown in FIG. 5B) which operates in analogous fashion to above-described air spring 16. (The conventional components of gooseneck hitch 100 are shown, but not described in detail herein.) Air spring assembly 102 includes two variable-pressure air springs 104a, 104b (preferably continuously variable pressure air springs), attached between support members 12 and 14 by nuts or other suitable fasteners. The pressure in air springs 104a, 104b is adjustable via a valve assembly 316. If desired, one or more auxiliary shock absorbers of any suitable type may be connected between first and second support members 12, 14 of gooseneck hitch 100 to provide additional dampening action.

Gooseneck hitch 100 includes a slide block assembly 300 with at least one slide block 302 and a generally vertical support 304 which is attached to first support member 12. Slide block 302 is attached to support 304 by screws, nuts, or other suitable fasteners in holes 306, and is configured with a generally vertical notch or groove 308. A key 310 is attached to the interior surface of a hollow housing 312 by screws or other suitable fasteners 314. Slide block 302 is made of NYOIL or other suitable low-friction material.

In this embodiment of the invention, groove 308 is configured for slidably receiving key 310, thereby helping maintain the relative alignment of first and second support members 12, 14 when gooseneck hitch 100 is in use.

Like above-described receiver hitch 10, gooseneck hitch 100 typically transfers no more than approximately 20% of the movement transferred between a tow vehicle and a trailer by a conventional lock-down type hitch. The multi-directional dampening action provided by gooseneck hitch reduces transmission of movement between the vehicle and the trailer, resulting in a smoother, safer ride for the driver and passengers, and reduced wear and tear on the load, the vehicle, and the trailer.

Gooseneck hitch 100 is made of sturdy, durable materials, in conformance with applicable standards. For example, a gooseneck hitch 100 that can support a pin weight of up to approximately 7,000 lb. can be used with a trailer having a gross weight of approximately 25,000 lb.; heavier-duty hitches can support higher gross weights. Gooseneck hitch 100 may include accessories such as air pressure indicators, ride height indicators, safety chains, and other devices familiar to those skilled in the art.

Figure 6A:
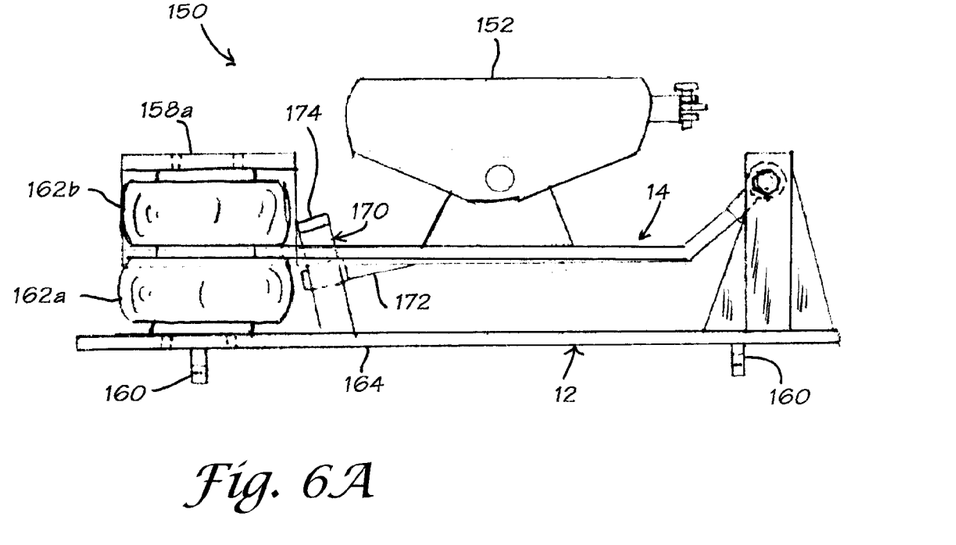
FIG. 6A is a side view of a fifth wheel-type trailer hitch with multi-directional dampening action according to the present invention.
Figure 6B:
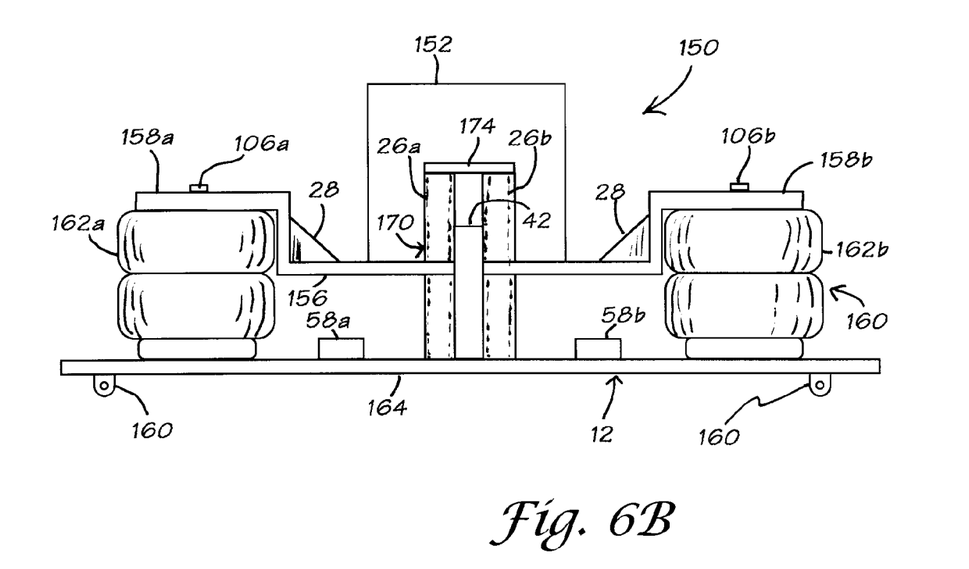
FIG. 6B is a rear, partial-cross-sectional view of the trailer hitch of FIG. 6A.

A fifth wheel-type trailer hitch according to the present invention is shown in FIGS. 6A and 6B. A fifth wheel hitch 150 for heavy-duty applications includes first and second support members 12, 14 (as for above-described gooseneck hitch 100, conventional components of the hitch are shown schematically but not described in detail). A fifth wheel head or anvil (shown schematically as 152) is attached to a second support member 14 by any suitable fasteners known in the art. Anvil 152 may be any suitable type of anvil used with fifth wheel hitches, preferably the type of anvil that can be adjusted both vertically and horizontally. Anvils made by the Reese, Drawtite, and Binkley companies, as well as others, may be useful.

First support member 12 includes a mounting plate 164 with and a plurality of mounting tabs 160 of any suitable type. First support member 12 may be attached directly to the bed of the tow vehicle, but is preferably bolted to rails which are mounted to the bed in a manner known to those skilled in the art. If desired, auxiliary shock absorbers may be mounted between first and second support members 12, 14 to provide additional cushioning and dampening action.

Second support member 14 in this embodiment includes a spreader bar 156 with upwardly-extending flanges 158a, 158b. Gussets (such as gussets 28) may be added for extra structural support if desired. Additional gussets and other reinforcements may be provided at other potential stress points of fifth wheel hitch 150.

An air spring assembly 160, which operates in analogous fashion to above-described air spring 16, has at least one, and preferably a plurality of pairs of air springs is attached between first and second support members 12, 14. Air spring assembly 160 may, for example, have four such air springs, one at each of the four corners of fifth wheel hitch 150. Alternatively, assembly 160 may have four pairs of air springs, one pair at each corner of the hitch. Air springs 162a, 162b are attached between support members 12 and 14 by any suitable types of fasteners (shown schematically as 106a, 106b). Like above-described air springs 104a, 104b, air springs 162a, 162b work "in parallel" or somewhat independently of each other to cushion the tow vehicle from jolts, swaying, and other motion of the trailer.

A slide block assembly 170 includes a slide block 42 terminating a bar 172 which is operably connected to anvil 152. Slide block 42 is slidably received by a pair of tracks 26a, 26b in a support structure 140. The movement of slide block 42 is limited by a stop 174 and mounting plate 164 of first support member 12. Bump stops 58a, 58b may be attached to plate 164 to cushion first and second support members 12, 14 against slamming (the bump stops may alternatively be attached to bar 156). If present, bump stops 58a, 58b are made of a somewhat resilient, somewhat compressible material such as hard rubber or plastic.

The movement of slide block 42 in tracks 26a, 26b helps reduce the transmission of relative movement between the tow vehicle and the trailer. In addition, air springs 162a, 162b operate substantially independently of each other to provide six-way dampening action that reduces the effects of road conditions and also reduces the transmission of trailer movement to the tow vehicle (or vice versa).

Figure 7A:
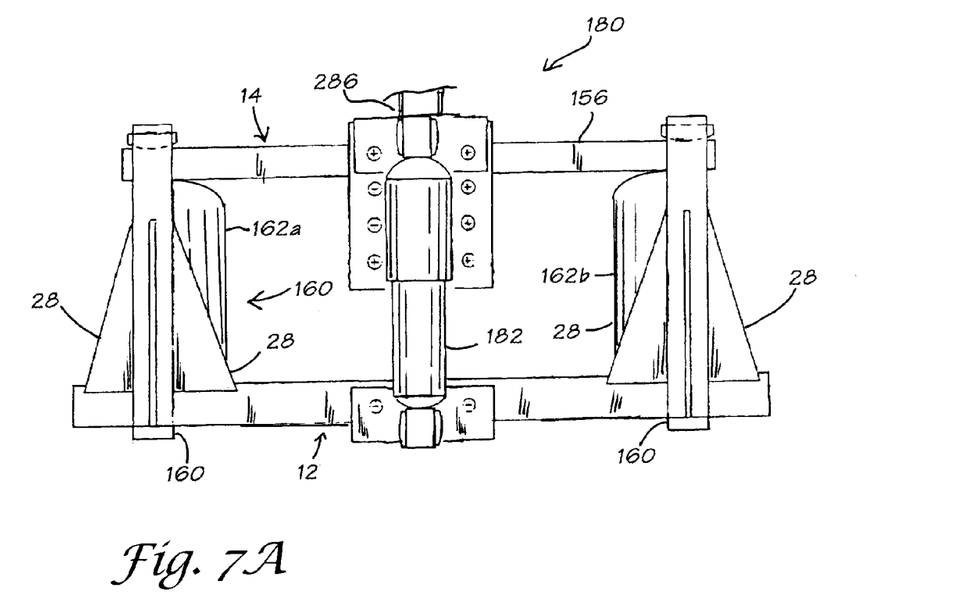
FIG. 7A is a side, partial-cross-sectional view of another fifth wheel-type trailer hitch with multi-directional dampening action according to the present invention.
Figure 7B:
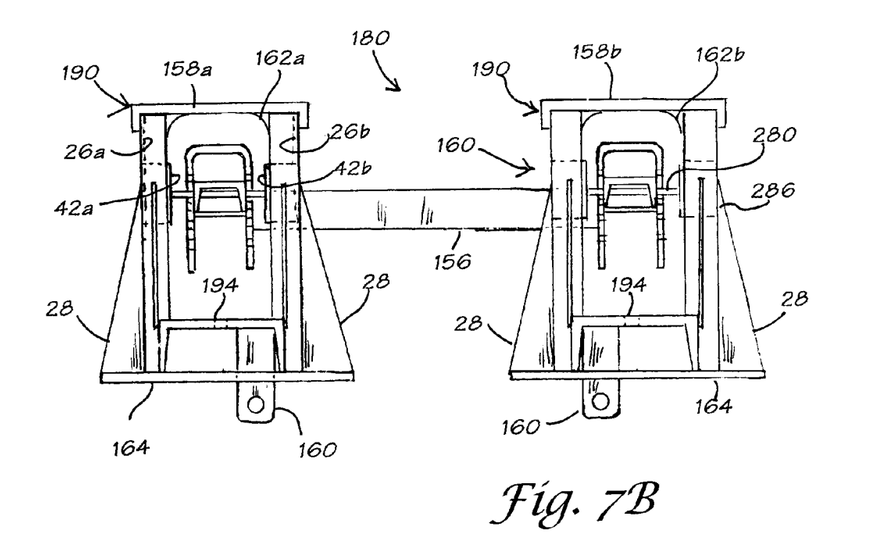
FIG. 7B is an end view of the trailer hitch of FIG. 7A.

Another fifth wheel hitch according to the present invention is shown in FIGS. 7A and 7B. A fifth wheel-type trailer hitch for lighter-duty applications includes first and second support members 12, 14 (conventional components of the hitch are shown schematically but not described in detail). A fifth wheel head or anvil may be attached to second support member 14 by any suitable fasteners known in the art. Anvil 152 may be any suitable type of anvil used with fifth wheel hitches, including but not limited to anvils made by the Reese, Drawtite, and Binkley companies.

First support member 12 includes a mounting plate 164 with a plurality of mounting tabs 160 of any suitable type. First support member 12 may be attached directly to the bed of the tow vehicle, but is preferably bolted to rails which are mounted to the bed in a manner known to those skilled in the art. If desired, auxiliary shock absorbers (such as a shock absorber 182) may be operably connected between first and second support members 12, 14 to provide additional cushioning and dampening action. If present, shock absorbers 182 connected to mounting brackets 184, 186 by bolts or other suitable fasteners. Alternatively, shock absorbers 182 may be connected directly to bars 156, 164.

Second support member 14 includes a spreader bar 156 with upwardly-extending flanges 158a, 158b. Gussets (such as gussets 28) may be added for extra structural support if desired, generally as shown. Additional gussets and other reinforcements may be provided at other potential stress points of fifth wheel hitch 150.

An air spring assembly 160 is operably connected between first and second support members 12, 14 at each of the four corners of fifth wheel hitch 180. Air spring assembly 160, which operates in analogous fashion to above-described air spring 16, includes at least one air spring; alternatively, assembly 160 may have a pair of air springs. Air springs 162 are attached between support members 12 and 14 by any suitable types of fasteners (shown schematically as 106). Like above-described air springs 104a, 104b, air springs 162 work "in parallel" or somewhat independently of each other to cushion the tow vehicle from jolts, swaying, and other motion of the trailer.

A slide block assembly 170 at each of the four corners of fifth wheel hitch 180 includes a pair of slide blocks 42a, 42b configured for slidable movement in tracks 26a, 26b in a support structure 190. The movement of slide blocks 42a, 42b is limited by stops 192, 194. Bump stops (such as above-described bump stops 58a, 58b) may be attached to plate 164 (or some other convenient position) to help prevent slamming.

Figure 8:
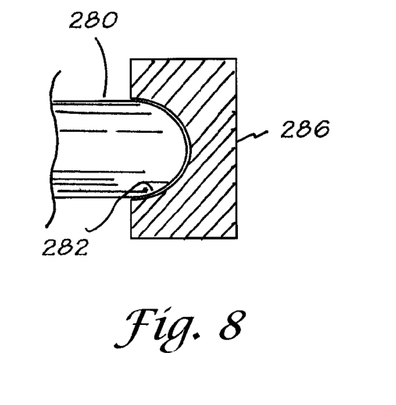
FIG. 8 is a cross-sectional view of a slide block usable with the trailer hitch of FIG. 7A.

Slide blocks 42a, 42b may have square, rectangular, oval, circular, or other cross sections (with correspondingly-shaped tracks 26a, 26b). For example, a slide block 280 usable with the invention may have a curved end 284 for use with a curved track 282 (FIG. 8).

The movement of slide blocks 42a, 42b in tracks 26a, 26b helps reduce the transmission of relative movement between the tow vehicle and the trailer. In addition, air springs 162 operate substantially independently of each other to provide six-way dampening action that reduces the effects of road conditions and also reduces the transmission of trailer movement to the tow vehicle (or vice versa).

While driving a vehicle that is connected to a trailer by fifth wheel hitches 150 or 180, less road-dependent movement of the trailer is transmitted to the vehicle due to the multi-directional dampening action provided by the hitch. Instead of acting as a single unit, the vehicle and the trailer act substantially independently of each other, resulting in better control by the driver and a safer, more comfortable ride.

A trailer hitch according to the present invention may transmit no more than approximately 20% of the back-and-forth, up-and-down, side-to-side movement of a trailer to a vehicle (or vice versa) than is transmitted by a conventional lock-down hitch. The tow vehicle and the trailer move substantially independently of each other, resulting in a smoother, safer ride for the driver, passengers, and cargo. Driver fatigue is postponed due to the more comfortable ride, easier handling, and improved braking of the vehicle-trailer combination, even on rough roads and badly cambered roads and curves. Wear and tear on the vehicle, trailer, and load are reduced.

Once installed, the hitch can readily be adjusted for different types and weights of load simply by adjusting the pressure in the air springs. If the air springs lose pressure for any reason, the hitch functions as a conventional lock-down or solid hitch until the user can effect any needed maintenance or repairs (bump stops 58a, 58b, where present, help prevent slamming of first and second support members 12, 14 into each other).

It will be understood by those of ordinary skill in the art that the materials, dimensions, weight, and selection of components for above-described trailer hitches depend on the particular application and anticipated load-bearing capacity of the hitches. All hitch components are preferably made of sturdy, durable materials, including but not limited to stainless steel, steel, aluminum, and iron. Metal components of hitches 10, 100, 150 may be machined of standard stock and welded or otherwise fastened together; alternatively, some or all of these components may be cast by suitable techniques known in the art of metal-working. By way of example, tracks 26 may be made of heavy-duty stainless steel. Slide blocks 42a, 42b in their various embodiments are preferably made of low-friction plastics such as NYLATRON, NYOIL, ACETAL, TEFLON and the like (however, laminate and composite materials may also be useful). Heavy-duty welds, gussets (such as 28a, 28b), and other reinforcements may be included as convenient.

If desired, retainers such as safety chains, weight distribution bars, sway bars, belts, and the like may connect first and second support members 12 and 14 in any of the above-described embodiments of the invention. If present, the retainers keep the vehicle and the trailer from separating if first and second support members 12 and 14 accidentally separate while the hitch is in use. All embodiments of the invention may include bump stops (such as stops 58a, 58b) at suitable locations to help cushion against slamming.

Figure 9:
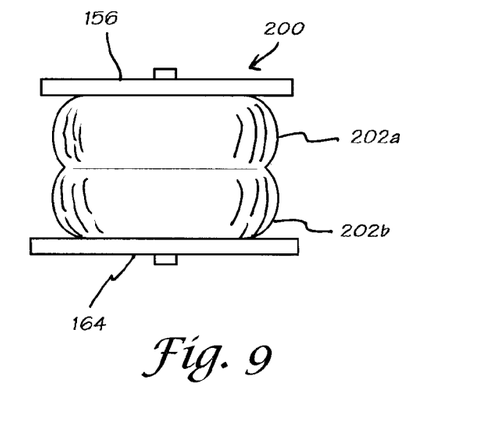
FIG. 9 is a side view of a air spring assembly usable with the invention, wherein a pair of individual air springs are configured to work in series with each other.

The Figures generally show the use of single bellows type air springs. However, double bellows air spring or an air spring assembly 200 (FIG. 9) may be used if desired. Assembly 200 has a plurality of air springs, for example, a pair of air springs 202a, 202b, wherein the individual air springs 202a, 202b work in tandem or "in series." Indeed, three or more such air springs may be useful for some applications.

A problem for many users (and potential users) of presently-available trailer hitches is that of attaching their selected trailer hitch to an available vehicle. Many hitches simply cannot be used with more than a few different vehicles: for example, a receiver type hitch designed for use with many Ford and Chevrolet pick-up trucks may not be usable with a minivan (even one made by the same manufacturer). In most cases, a customer who wants a trailer hitch for his or her vehicle has a limited selection to choose from, and that selection may not include the best type of hitch for that customer's intended towing applications. To address this problem, the present invention includes adapters that can interface hitches 10, 100, 150, 180 between most trailers (open and closed trailers, recreational vehicles or RVs, campers, horse and other animal trailers, etc.) and virtually any type or brand of motor vehicle (passenger cars, minivans, vans, pickup trucks, tractor trailers, etc.).

Figures 10A, 10B, 10C:
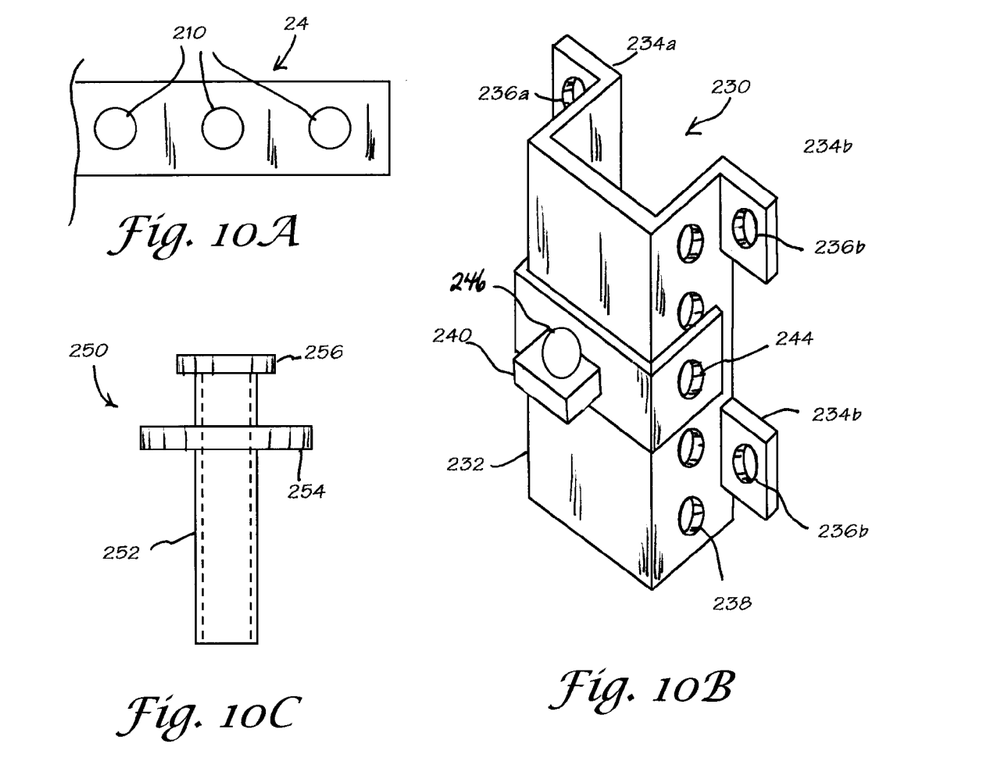
FIGS. 10A–H illustrate adapters for interfacing a trailer hitch according to the invention to a variety of trailers and tow vehicles.

A simple adapter may be formed by a plurality of spaced throughholes 210 in towbar 24 (FIG. 10A). Throughholes 210 permit attachment of towbar 24 to vehicles of different sizes and configurations, thereby adding to the versatility of hitches equipped with such a towbar. The optimum throughhole for any vehicle/trailer combination is selected based on the vehicle, the load capacity of the trailer, and the particular hitch used.

Another adapter 230 is shown in FIG. 10B. Adapter 230 consists of a generally vertical bar 232 with a pair of projections 234a, 234b at its upper end. Projections 234a, 234b have throughholes 236a, 236b whereby adapter 230 can be attached to a selected pair of throughholes 220a, 220b of plate 40 by nuts and bolts (or other suitable fasteners). Bar 232 has a spaced series of throughholes 238 for attachment of a mounting bracket 240.

A mounting bracket 240, with a throughhole 244, is attached to a selected throughhole 238 of bar 232 by nuts and bolts or other suitable fasteners; a ball hitch 246 is attached as shown. Adapter 230, used alone or in conjunction with plate 40 as shown in FIG. 2, allows the user to quickly and easily adjust the relative heights of the tow vehicle and the trailer simply by selecting the optimum combination of throughhole 238 (for mounting bracket 240 to adapter 230) and throughholes 220a, 220b (for mounting adapter 230 to plate 40).

Another adapter 250, shown in FIG. 10C, allows the user to use fifth wheel hitches 150, 180 with a standard gooseneck mount. Adapter 250 has a generally cylindrical base 252 which is attachable to a gooseneck mount (not shown), with a circumferential flange or plate 254 and a king pin 256.

Figure 10D:
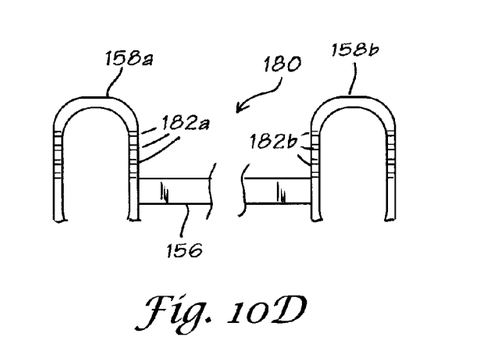

A spreader bar assembly 260 for use with fifth wheel hitches 150, 180 is shown in FIG. 10D. Assembly 260 has a pair of spreader bars 158a, 158b connected by a bar 156; bars 158a, 158b have a plurality of throughholes 182a, 182b. The combination of bar 156 and throughholes 182a, 182b allows the user to adjust the horizontal and vertical positions of assembly 180 in order to interface anvil 152 to trailer hitch 180.

Figure 10E:
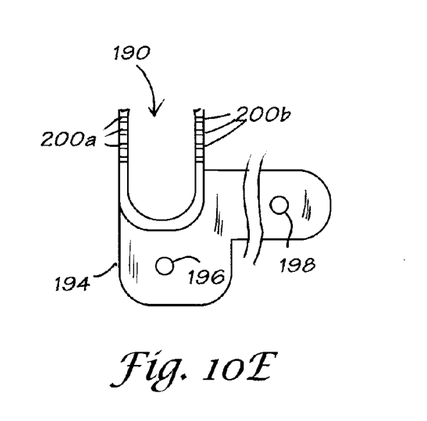

A quick change ball mount 190 (FIG. 10E) includes an approximately U-shaped section 192 welded or otherwise affixed to an L-shaped plate 194 with throughholes 196, 198 formed therein. Ball mount 190 is bolted to any suitable base at throughholes 200a, 200b; a ball-type hitch is attached at throughhole 196 and a weight distribution component (not shown) at throughhole 198. Ball mount 190 is reversible so that throughhole 198 can be positioned at either the left or the right of section 192.

Figure 10F:
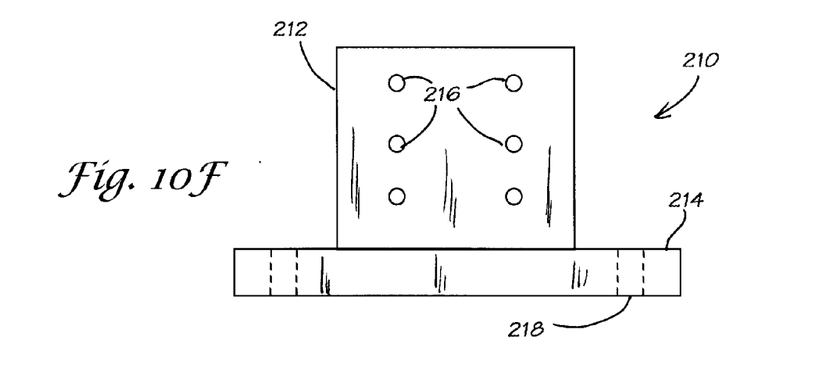
Figure 10G:
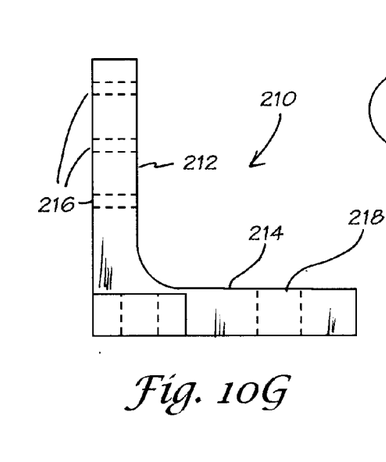
Figure 10H:
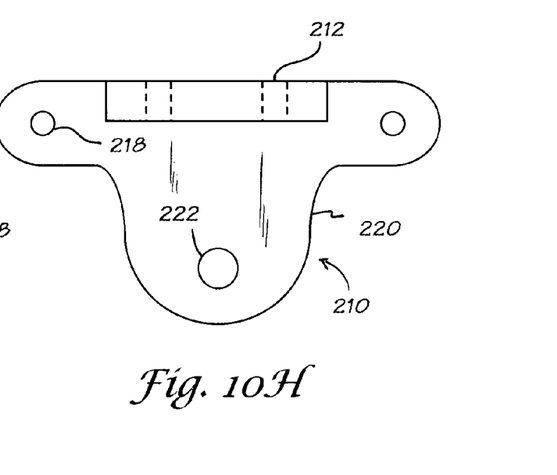

Still another adapter 210 is shown in FIGS. 10F–H (front, side, and top views, respectively). Adapter 210 includes a plate 212, a bar 214, and a plurality of throughholes 216, 218 formed as shown. A tongue 220 projects outwards from bar 218 (FIG. 8I), with a throughhole 222 for attachment of a ball-type hitch. Like ball mount 190, adapter 210 can be inverted for use. Plate 272 can be attached at any selected pair of throughholes 220a, 220b of plate 40.

As noted above, slide blocks 42a, 42b and tracks 26a, 26b may assume a variety of configurations without departing from the spirit of the present invention. Slide block 42a as shown in FIGS. 3, 5A and 5B may be used with any of hitches 10, 100, 150, 180. Similarly, either the "fixed" or "floating" support of support members 12, 14 may carry slide blocks 42a, 42b with the other support carrying tracks 26a, 26b.

Other modifications include rotating tracks 26a, 26b and slide blocks 42a, 42b (as shown in FIG. 3) by 90°. The blocks may be connected by spacer bars (not shown) for additional structural support if desired.

With respect to the above description of the invention, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing description is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. Thus, it will be apparent to those skilled in the art that many changes and substitutions can be made to the preferred embodiment herein described without departing from the spirit and scope of the present invention as defined by the appended claims.

What is claimed is:

1. A trailer hitch for connecting a tow vehicle to a trailer, said trailer hitch comprising:

a frame;

at least one generally vertical track attached to said frame;

a carriage;

at least one slide block assembly attached to said carriage, said slide block assembly configured for slidable movement in said track;

at least one stop operably connected to said track, said stop limiting vertical movement of said slide block assembly with respect to said track;

a spherical rod-end assembly including at least one pair of rods, each of said rods rotatably connected between said frame and said carriage to permit relative movement therebetween; and at least one air spring having continuously variable pressure, said air spring having a first end and a second end, said first end operably connected to said frame and said second end operably connected to said carriage, said slide block assembly engaging said track for slidable movement therein when one of said frame and said carriage is attached to a tow vehicle and the other of said frame and said carriage is attached to a trailer, said at least one air spring and said movement of said at least one slide block assembly providing multi-directional dampening to reduce transmission of relative motion between said tow vehicle and said trailer.

2. The trailer hitch as recited in claim 1, wherein said at least one track further comprises a plurality of spaced-apart tracks, and wherein said at least one slide block assembly further comprises a plurality of spaced-apart slide block assemblies, each of said slide block assemblies positioned for slidable movement in a different one of said tracks.

3. The trailer hitch as recited in claim 1, wherein one of said frame and said carriage is attachable to a receiver mount, a gooseneck mount, or a fifth wheel mount.

4. The trailer hitch as recited in claim 1, further comprising adapter means for interfacing said trailer hitch between said tow vehicle and said trailer.

* * * * *